(12) United States Patent
Simon et al.

(10) Patent No.: US 7,769,494 B1
(45) Date of Patent: Aug. 3, 2010

(54) IRRIGATION TIMER FOR ADJUSTING WATERING TIME BASED ON TEMPERATURE AND HUMIDITY CHANGE

(75) Inventors: Timothy M. Simon, San Francisco, CA (US); Matthew T. Fisher, Reno, NV (US); Blaine M. Smith, Portland, OR (US)

(73) Assignee: Tim Simon, Inc., San Francisco, CA (US)

( * ) Notice: Subject to any disclaimer, the term of this patent is extended or adjusted under 35 U.S.C. 154(b) by 0 days.

(21) Appl. No.: 12/500,531

(22) Filed: Jul. 9, 2009

Related U.S. Application Data

(62) Division of application No. 11/752,779, filed on May 23, 2007, now abandoned, which is a division of application No. 11/325,746, filed on Jan. 5, 2006, now abandoned.

(60) Provisional application No. 60/664,561, filed on Mar. 23, 2005.

(51) Int. Cl.
*G05D 11/00* (2006.01)
*A01G 25/00* (2006.01)

(52) U.S. Cl. .......................... 700/284; 239/68; 239/69; 239/70

(58) Field of Classification Search .................. 700/284; 239/68–70
See application file for complete search history.

(56) References Cited

U.S. PATENT DOCUMENTS

| | | | |
|---|---|---|---|
| 3,874,590 A * | 4/1975 | Gibson | 239/63 |
| 4,040,436 A * | 8/1977 | Caldwell | 137/78.3 |
| 4,165,532 A | 8/1979 | Kendall et al. | |
| 4,502,288 A | 3/1985 | Lynch | |
| 4,760,547 A | 7/1988 | Duxbury | |
| 4,951,204 A | 8/1990 | Mylne, III | |
| 5,038,268 A | 8/1991 | Krause et al. | |
| 5,187,797 A | 2/1993 | Nielsen et al. | |
| 5,208,855 A * | 5/1993 | Marian | 239/69 |
| 5,251,153 A | 10/1993 | Nielsen et al. | |
| 5,293,554 A | 3/1994 | Nicholson | |
| 5,337,957 A | 8/1994 | Olson | |
| 5,444,611 A | 8/1995 | Woytowitz et al. | |
| 5,602,728 A | 2/1997 | Madden et al. | |
| 5,715,866 A | 2/1998 | Granger | |
| 5,782,296 A | 7/1998 | Mehta | |
| 5,797,417 A | 8/1998 | DeLattre et al. | |
| 5,839,660 A * | 11/1998 | Morgenstern et al. | 239/63 |
| 5,853,122 A | 12/1998 | Caprio | |

(Continued)

FOREIGN PATENT DOCUMENTS

DE   3334117 A1   4/1985

*Primary Examiner*—Michael D Masinick
(74) *Attorney, Agent, or Firm*—James F. Hann; Haynes, Beffel & Wolfeld LLP

(57) ABSTRACT

A method automatically adjusts the amount of water supplied by a water timer having a user interface and a controller programmed to provide control signals for controlling water flow control devices. The time of day on a base day is chosen, and a base ambient temperature and a base ambient humidity are sensed. Base ambient temperature and humidity signals are provided to the controller. The current ambient temperature and humidity are subsequently sensed and corresponding signals are provided to the controller on at least one day following the base day at a time corresponding to the chosen time of day. Control signals are modified, thereby modifying watering amounts, according to the base and current ambient temperature and humidity signals.

6 Claims, 6 Drawing Sheets

U.S. PATENT DOCUMENTS

| | | |
|---|---|---|
| 5,921,280 A | 7/1999 | Ericksen et al. |
| 6,145,755 A | 11/2000 | Feltz |
| 6,164,374 A | 12/2000 | Rhodes et al. |
| 6,259,955 B1 | 7/2001 | Brundisini et al. |
| 6,298,285 B1 * | 10/2001 | Addink et al. .............. 700/284 |
| 6,314,340 B1 | 11/2001 | Mecham et al. |
| 6,337,635 B1 | 1/2002 | Ericksen et al. |
| 6,453,215 B1 | 9/2002 | Lavoie |
| 6,490,505 B1 | 12/2002 | Simon et al. |
| 6,507,775 B1 | 1/2003 | Simon et al. |
| 6,581,846 B1 | 6/2003 | Rosen |
| 6,585,168 B1 | 7/2003 | Caprio |
| 6,595,430 B1 | 7/2003 | Shah |
| 6,619,555 B2 | 9/2003 | Rosen |
| 6,647,319 B1 | 11/2003 | Goldberg |
| 6,789,739 B2 | 9/2004 | Rosen |
| 6,823,239 B2 | 11/2004 | Sieminski |
| 6,824,069 B2 | 11/2004 | Rosen |
| 6,892,113 B1 | 5/2005 | Addink et al. |
| 6,895,987 B2 * | 5/2005 | Addink et al. ............. 137/78.3 |
| 7,266,428 B2 * | 9/2007 | Alexanian ................... 700/284 |
| 2002/0002425 A1 | 1/2002 | Dossey et al. |
| 2002/0020441 A1 | 2/2002 | Addink |
| 2004/0181315 A1 | 9/2004 | Cardinal et al. |

* cited by examiner

IRRIGATION TIMER FOR ADJUSTING WATERING TIME BASED ON TEMPERATURE AND HUMIDITY CHANGE

CROSS-REFERENCE TO RELATED APPLICATIONS

This patent application is a divisional of U.S. patent application Ser. No. 11/752,779, entitled Water Timer and Method, filed 23 May 2007; which is a divisional of U.S. patent application Ser. No. 11/325,746, entitled Water Timer and Method, filed 5 Jan. 2006; which claims the benefit of U.S. provisional Patent Application No. 60/664,561, entitled Water Timer And Method, filed 23 Mar. 2005.

This patent application is related to U.S. Patent Application No. 60/652,128, entitled Ambient Environment Sensor for Watering Timer, filed 11 Feb. 2005. This patent application is also related to U.S. patent application Ser. No. 11/325,994, filed 5 Jan. 2006, entitled Water Timer with Watering Plan and Method.

FIELD OF THE INVENTION

The present invention relates generally to water timers used to control the operation of flow control devices, typically solenoid-actuated valves and pump relays, for watering systems using one or more of sprinkler devices, drip irrigation devices and other watering devices.

BACKGROUND OF THE INVENTION

Conventional water timers typically require that they be programmed by the user using hardware inputs, for example toggle switches, sliding switches and rotatable knobs, or a combination of hardware inputs and touch screen inputs. The screens are used to display both operational functions and programming values. The user enters commands into the water timer, such as for setting the current time and date and programming the water timer, by pressing keys and/or pressing at appropriate positions on a touch screen display. In many cases an abbreviated set of instructions explaining the steps that must be taken to operate the water timer is printed on a door or cover of the water timer; complete instructions are typically separately documented so that programming such a water timer can be quite confusing and tedious. Also, programming conventional water timers using screen displays is typically accomplished only after selecting a series of different screens on the display. In addition, information relating to the status of the water timer is often accessible only by reviewing different screens on the display.

BRIEF SUMMARY OF THE INVENTION

The present invention is directed to a method for automatically adjusting the amount of water supplied by a water timer. The water timer is of the type comprising a user interface and a controller coupled to the user interface and programmed to provide control signals for controlling a plurality of flow control devices. Each flow control device is capable of controlling the passage of water from a water source to a watering zone. The method is carried out as follows. The time of day on a base day is chosen. A base ambient temperature is sensed at the chosen time of day on the base day and a base ambient temperature signal is provided to the controller. The base ambient humidity is sensed at the chosen time of day and a base ambient humidity signal is provided to the controller. A current ambient temperature is subsequently sensed and a current ambient temperature signal is provided to the controller. A current ambient humidity is subsequently sensed and a current ambient humidity signal is provided to the controller. The subsequently sensing steps are carried out on at least one day following the base day at a time corresponding to the chosen time of day. Control signals are modified, thereby modifying watering amounts, according to the base and current ambient temperature signals and the base and current ambient humidity signals. In some examples the choosing step is carried out by a user actuating a base-setting input of said interface at the chosen time of day on the base day.

Various features and advantages of the invention will appear from the following description in which the preferred embodiments have been set forth in detail in conjunction with the accompanying drawings.

DETAILED DESCRIPTION OF THE INVENTION

The following description of the invention will typically be with reference to specific structural embodiments and methods. It is to be understood that there is no intention to limit the invention to the specifically disclosed embodiments but that the invention may be practiced using other features, elements, methods and embodiments.

A watering timer made according to embodiments of the present invention may provide one or more of the following advantages. All of the display areas and input areas may be single-function areas. A graphical representation of the watering duration for each watering zone may be provided. This provides the user with an instantaneous, visual graphic (as well as a numeric) indication of the watering duration for each zone for a watering cycle. The controller may be programmed to modify the control signals to the flow control devices according to, for example, the ambient temperature and humidity so that the amount of watering can be adjusted manually or automatically (such as using an automatic system discussed below as the Water Logic system) accordingly. The controller may also be programmed to a permit a user to select input settings for a watering cycle, such as selecting the zone, watering duration, start time and the day or days of the week, in any order and all on the same screen. As used in this application, all on the same screen means that everything needed for setting a watering plan is simultaneously visible; this is possible when all of the display areas and input areas are single-function areas. This flexibility in setting a watering plan can greatly simplify how the user creates a watering plan, the watering plan including one or more watering cycles.

Figure 1:
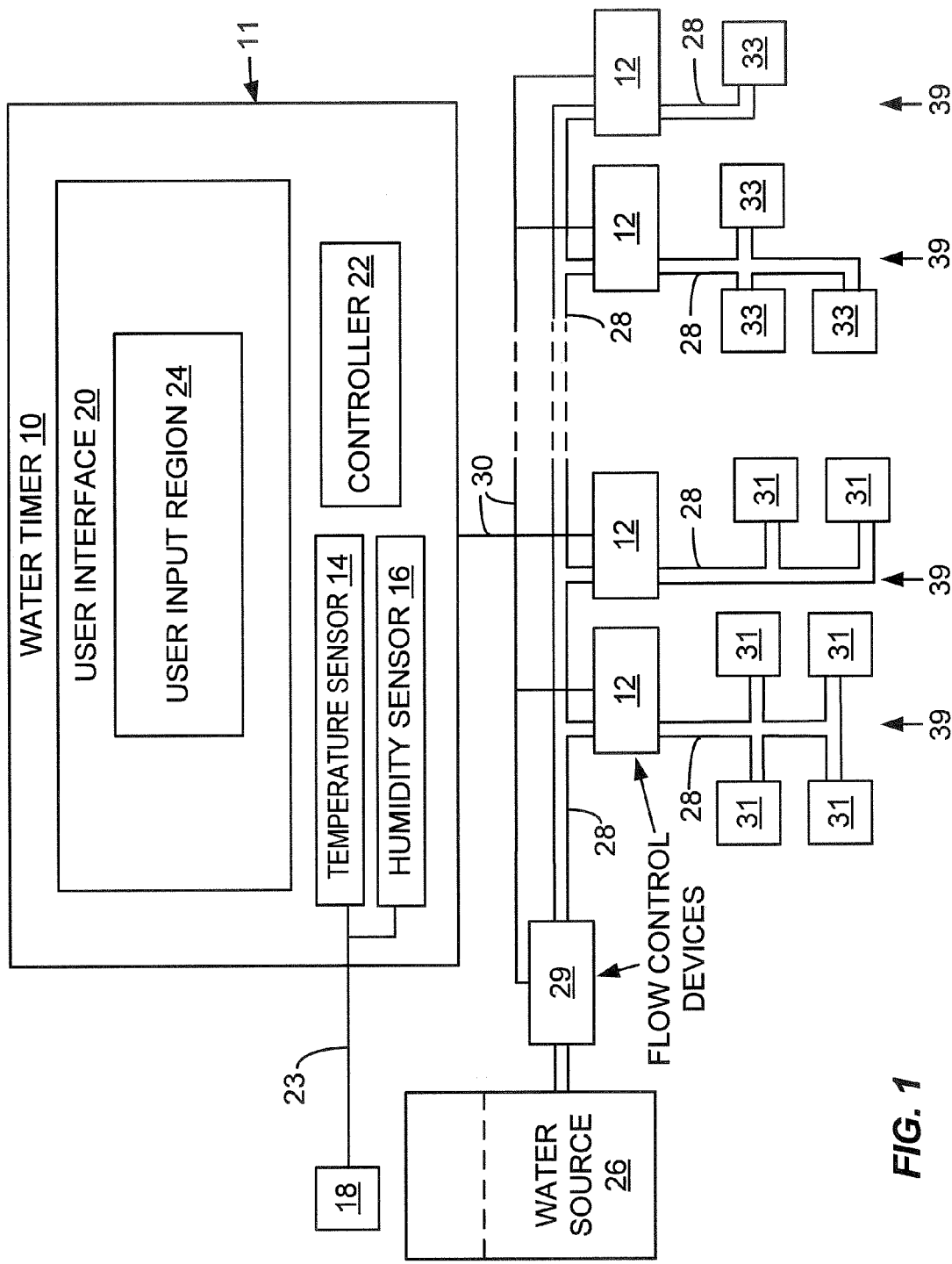
FIG. 1 is a schematic illustration of a water timer made according to the invention connected flow control devices, the flow control devices coupled to watering lines and a watering source.

FIG. 1 is a schematic illustration of a water timer 10, comprising a housing 11, connected to a number of flow control devices 12, a temperature sensor 14, a humidity sensor 16 and a rain sensor 18. Flow control devices 12 may include, for example, solenoid valves, pump relays or a combination thereof. Water timer 10 includes a user interface 20 coupled to a controller 22. Rainfall signals are provided to controller 22 through a line 23. In one preferred embodiment temperature sensor 14 and humidity sensor 16 are located within housing 11 with the expectation that water timer 10 will be used outside or within a sheltered area, such as within a garage, but not an area that is heated or cooled. However, if desired one or both of temperature sensor 14 and humidity sensor 16 may be positioned remote from water timer 10, such as in the vicinity of rain sensor 18.

User interface 20 includes a user input region 24. A water source 26, such as a municipal water supply, is also connected to flow control devices 12. Flow control devices 12 control the flow of water from water source 26 to watering lines 28 based upon signals from water timer 10 through signal lines 30. A master valve 29 is open whenever any of the flow control devices 12 are open. While master valve 29 may not be necessary, it reduces water usage if there are leaks. Without the master valve, there is always pressure to flow control devices 12. So if there are leaks at any of flow control devices 12, and/or if one or more of flow control devices 12 are not shutting the water completely off, water will be dribbling out when there is no watering. Also, master valve 29 can be replaced by, for example, a pump solenoid when a pump is used to deliver water along watering lines 28, typically from a water well; in this case the pump solenoid is typically actuated about one second before any flow control device 12 is actuated.

While each flow control device 12 in FIG. 1 is shown to control the flow of water through a single watering line 28, one or more of flow control devices 12 may be used to control the flow of water through more than one watering line 28. Watering lines 28 may be a variety of watering lines used for variety of watering purposes. For example, watering lines 28 may have one or more sprinkler heads 31, or may be used for above ground or below ground drip irrigation using drip irrigation lines 33. Also, one or more of lines 23, 30 connecting sensor 18 and flow control devices 12 to water timer 10 may be replaced by radiofrequency or other non-hardwired connections.

The various features and components of water timer 10 and rain sensor 18 will be discussed first, followed by a discussion of the operation of the water timer.

Structural Details

Figure 2:
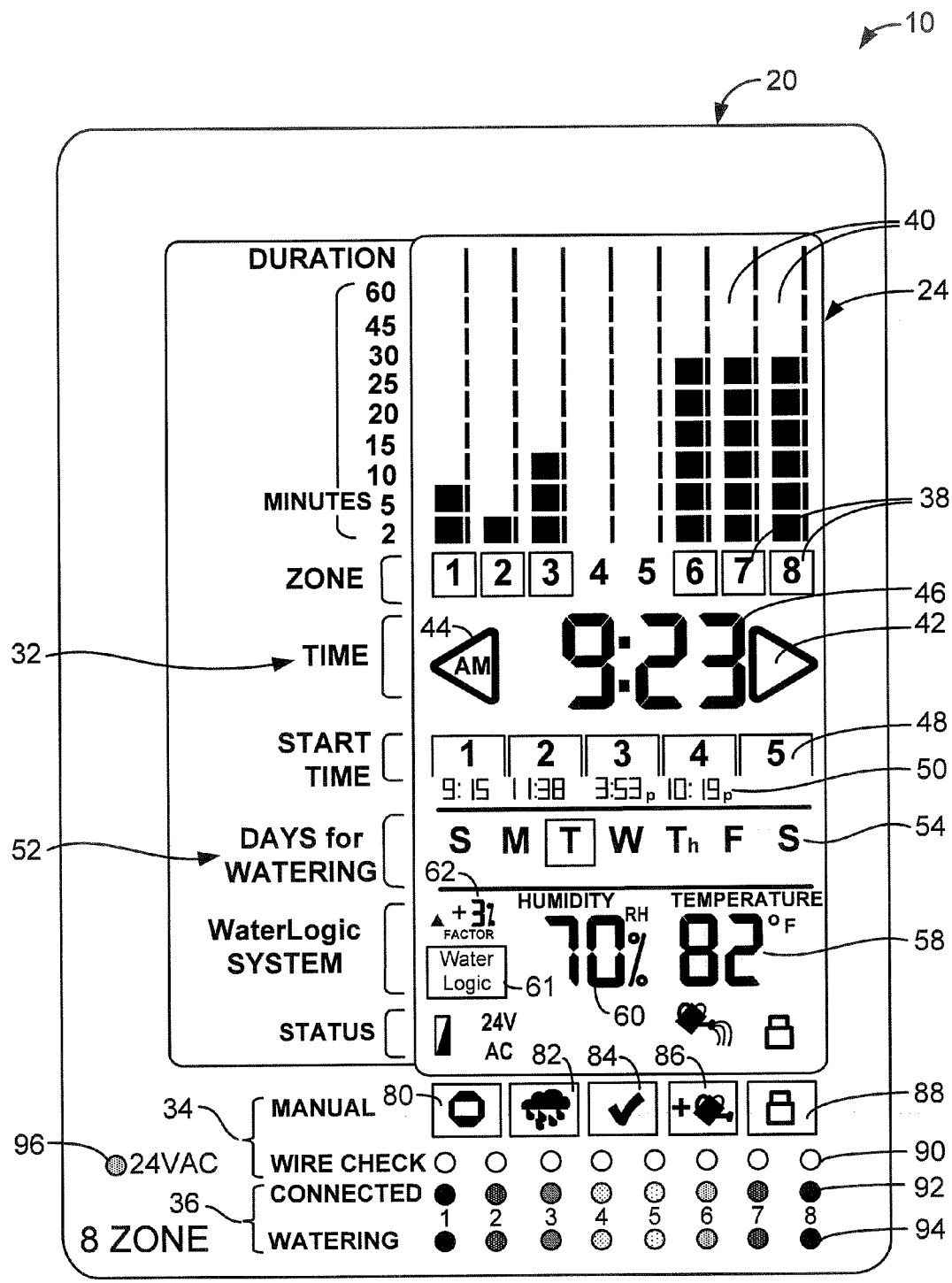
FIG. 2 illustrates the user interface of the water timer of FIG. 1, the user interface including a user input region, the user input region including a touch screen, hardware keys and status lights.

FIG. 2 illustrates one embodiment of a water timer 10 made according to the invention. User input region 24 includes broadly a touch screen 32, hardware keys 34 and status lights 36. User input region 24 provides, as will be discussed in more detail below, a plurality of display areas for display of water timer status information and a plurality of input areas for user input of water timer inputs. One feature of the invention is that all of the display areas and input areas are preferably single-function areas and are simultaneously visible to and accessible by user. This helps to greatly simplify use of water timer 10 by simultaneously providing all information for a particular watering cycle (a watering cycle starting on a designated day(s) and time(s)) to the user without the need for scrolling, moving between different screens, or other conventional operations common with devices in which the display areas and/or input areas are multiple function display and/or input areas used for displaying and/or inputting multiple data entries for the same or different categories of information. A watering plan may include one or more watering cycles.

Many of the areas on touch screen 32 are touch-sensitive areas used to input information. Other areas on touch screen 32 are display areas used to display information, such as time, temperature, status, etc.; some of the areas do both, that is are touch-sensitive input areas and also are information display areas.

Touch screen 32 includes numbered zone input areas 38 which are selected by the user pressing on the appropriate zone number which causes the particular zone input area to indicate selection by being surrounded by a line, called being boxed, as illustrated with zones 1-3 and 6-8 in FIG. 2. Zones 1-3 and 6-8 in FIG. 2 are scheduled to be watered beginning with zone 1 at the next start time, discussed below. Each zone input area 38 corresponds to a watering zone 39 watered by a flow control device 12. Aligned with each zone input area 38 is a watering duration area 40 which provides the user with a quick, graphical visual indication of the watering duration for the particular watering cycle being displayed. A more accurate indication of a particular watering duration (such as 12 minutes) can be accessed in a manner to be discussed below. Below zones input areas 38 are increase and decrease arrow input areas 42, 44 on either side of a date/time display area 46. Below areas 42, 44, 46 are start time input areas 48 with a corresponding start time display area 50 directly beneath each start time input area 48. The next start time will typically flash when water timer 10 is unlocked (discussed below). Increase and decrease arrow input areas 42, 44 are used for a number of purposes including selecting watering duration, initially setting the time for display area 46 and selecting or changing start times for a watering cycle.

Figure 3:
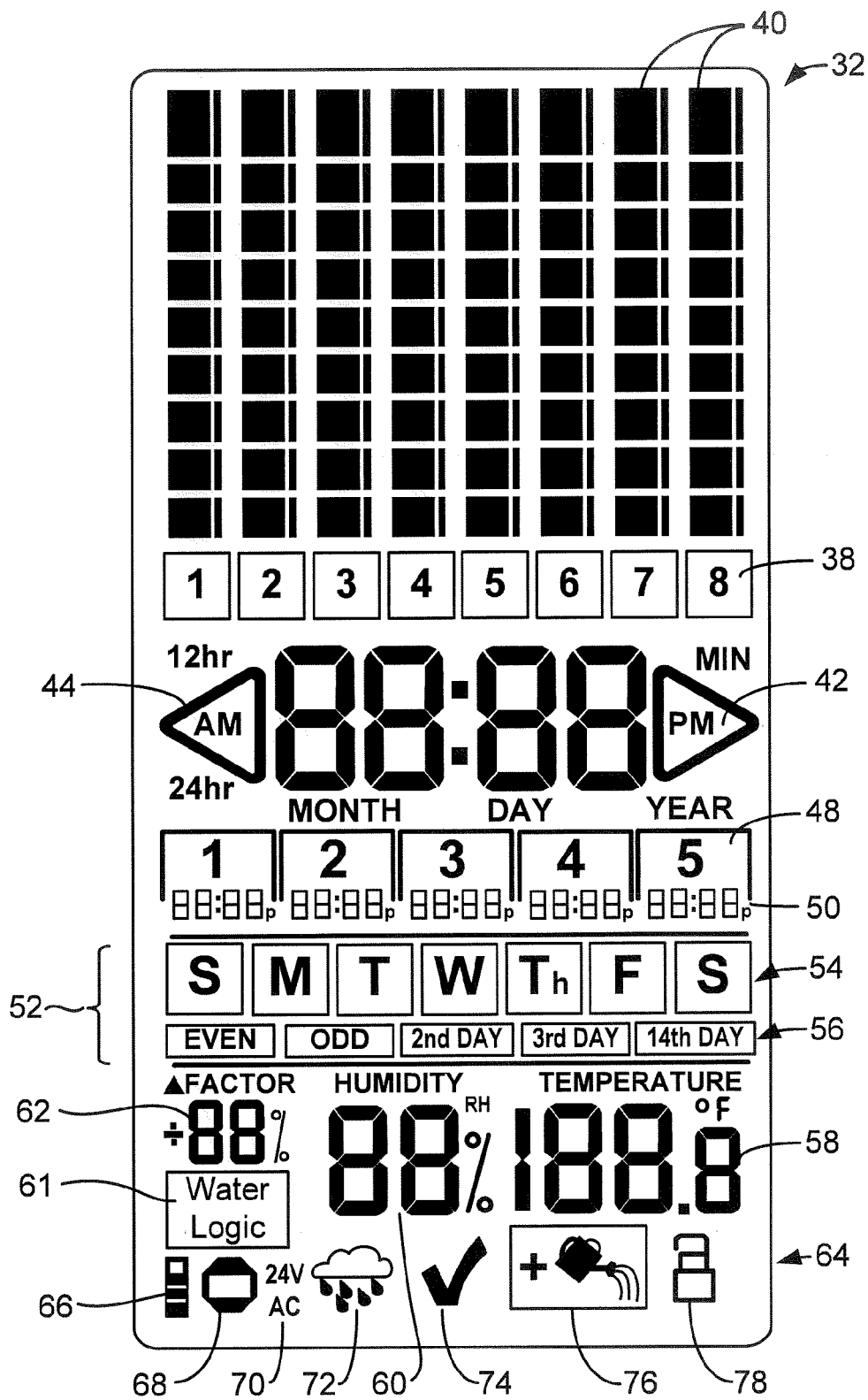
FIG. 3 illustrates the touch screen of FIG. 2 with all of the display areas, input areas and icons being visible for identification purposes.

Select day input areas 52 are used to select the day or days for a watering cycle for the watering plan. As shown in FIG. 3, input areas 52 include Sunday through Saturday select day input areas 54 and other select day input areas 56, specifically even days, odd days, second day, third day and 14th day input areas. The even and odd day input areas are possible because controller 22 includes a calendar; this permits the user to automatically comply with even or odd day watering restrictions. The current day, Tuesday in FIG. 2, is boxed.

To remove a start time, deselect the start time by setting it to off; this is done using arrows 42, 44 to scroll the time at area 46 to between 11:59 p.m. and 12:00 a.m. causing the start time to be deselected and the word "off" to be displayed at area 46 and at area 50. To deselect a day, touch the previously-selected input area 52 and it will be deselected as indicated by removal of the box. To remove a zone from a multiple zone watering plan, set the watering zone duration to off (such as through the watering duration area 40 for the selected zone) or by touching target zone input area 38 for the selected zone. To remove a plan, set zone(s) duration to off, or the start times to off and/or deselect all the day(s).

The next portion of touch screen 32 relates to the use of temperature, humidity and rain sensors 14, 16 and 18. Water timer 10 is typically programmed so that after a sufficient rainfall, sensed by rain sensor 18, watering will be suspended, typically for 24 hours. Water timer 10 may also be programmed to provide an automatic adjustment of the amount of watering in each watering cycle according to how much the ambient temperature and humidity differs from a reference temperature and from a reference humidity. This automatic adjustment factor may be referred to as the Water Logic feature or system. As is discussed more in more detail below, if the humidity goes up and/or the temperature goes down from a reference humidity and/or temperature, the amount of watering will be decreased. Conversely, if the humidity goes down and/or the temperature goes up from a reference humidity and/or temperature, the amount of watering will be increased. This portion of touch screen 32 includes an ambient temperature display area 58, an ambient humidity display area 60, an ambient environment adjustment icon/input area 61, also called Water Logic icon/input area 61, and an adjustment factor display area 62 (which displays the watering adjustment+/−%, also called the delta factor, based upon the ambient temperature and humidity). The automatic ambient environment adjustment feature is activated by pressing on icon/input area 61. The operation of the Water Logic feature is described below.

Recognizing that windy days cause things to dry out more quickly, a wind sensor could also be used as a part of the Water Logic feature to permit the watering to be adjusted according to wind speeds. A simply constructed ambient environment sensor that reflects the effect of wind is disclosed in U.S. Provisional Patent Application No. 60/652,128, entitled Ambient Environment Sensor for Watering Timer, filed 11 Feb. 2005, the disclosure of which is incorporated by reference.

Touch screen 32 includes a number of status icons 64, see FIG. 3, used to provide information regarding the status or operation of water timer 10. A battery check icon 66 indicates when the internal battery within water timer 10 should be changed; batteries can be used to back up memory in case of AC power loss and for off wall programming. The run/suspend icon 68 will appear when the unit is on (active) but will blink (also called flash) when touched and all watering cycles will be suspended. A 24VAC icon 70 is visible when the AC adapter voltage is available and blinks (flashes) if missing; 24VAC typically must be available to run the valves 12. In addition, the 24VAC led 96 (see FIG. 2) is on when 24VAC is available.

A rain suspend icon 72 will appear when operation of water timer 10 has been suspended due to rain based upon either a signal from rain sensor 18 or a manual rain suspend input, discussed below with regard to hardware keys 34. The suspension of operation will typically be for 12 hours, 24 hours, until the start of the next day, or a combination thereof. Preferably, the suspension of operation will be 24 hours. A check mode icon 74 is visible when the user has placed water timer 10 in a check mode, discussed in more detail below, during which each flow control device 12 is operated for a set, typically short, period, such as two minutes, to permit watering in the various watering zones 39 to be checked. A watering can icon 76 is visible whenever water timer 10 signals a flow control device 12 to water its respective watering zone 39. A lock/unlock icon 78 shows if water timer 10 is in a locked or unlocked state.

Hardware keys 34, see FIG. 2, include a run/suspend key 80. Pressing key 80 suspends the operation of water timer 10 and causes run/suspend icon 68 to blink; pressing key 80 again allows water timer 10 to resume its normal watering functions and causes run/suspend icon 68 to stay on. Touching icon 68 can also be used for run/suspend instead of run/suspend key 80. Note that status icons 64 are both display areas and are touch-sensitive areas. However, because some of the status icons 64 are typically visible only when the respective task/status is current/active, they will often only be used to deactivate the particular state/task represented by keys 34. Pressing rain suspend key 82 halts all watering for a set period, such as 12 or 24 hours, after which water timer 10 again resumes its normal watering functions; timer 10 does not go back to pick up any missed watering cycles. Rain suspend icon 72 is visible while watering is suspended (touching rain suspend icon 72 can also be used to halt all watering for a set period).

Check mode key 84 is typically pressed when the user wants to check the operation of the various watering lines 28; during a check mode watering cycle each flow control device is actuated for a set, typically two-minute, time period to permit the user to do so. Check mode icon 74 is visible during a check mode watering cycle. Touching check mode icon 74 can also be used for the same purpose as check mode key 84. The check mode water cycle may be started if water timer 10 is in its run or suspend states. When the check mode key 84 is pushed, all other functions are overridden during the check mode cycle. At the end of the check mode cycle, the timer goes back to previous auto watering mode—run or suspend. When in the check mode, touching check mode key 84 again shuts off the check mode cycle.

Single watering cycle key 86, also called the + water hardware key 86, is pressed to allow the user to put in a single cycle watering plan for extra watering. Touching + water icon 76 can also be used for this purpose. If another watering plan is running, the single watering plan will run and when finished water timer 10 will go back to such watering plan and finish it from that time. Once the user has entered a single cycle watering plan, touching the single watering cycle key 86, or in some embodiments touching the + water icon 76, activates the single watering cycle and the single watering plan runs just once. A previously-entered single watering plan remains in memory and can be used or changed at any time.

Lock/unlock key 88 is used to lock and unlock water timer 10. Pressing lock/unlock key 88 to place water timer 10 in an unlocked state, indicated by lock/unlock icon 78 in an unlocked configuration, permits full operational access to the touch sensitive areas and hardware keys for setting watering plans. After the watering plan has been entered into water timer 10, pressing lock/unlock key 88 or lock/unlock icon 78 will lock the settings. Alternatively, the user can wait for 60 seconds and the system will automatically lock in the last settings.

Valve check buttons 90, also called the wire check buttons 90, one for each zone, directly operate flow control devices 12 to permit the user to check the watering system in the chosen zone. Pressing and holding a button 90 opens the associated flow control device 12, thus causing watering to begin; releasing the button turns off the water in that zone.

Valve check buttons 90 allow the user to bypass timer 10 to check the operation of flow control devices 12. When the user is first wiring the system, buttons 90 are a convenient way to test each device 12. Once the system has been running, and a flow control device 12 quits operating, the user does not know if water timer 10 is malfunctioning or the flow control device, typically a solenoid valve, is malfunctioning. Wiring check buttons 90 allow the user to make that determination before the user returns water timer 10 as defective.

Water timer 10 has two rows of status lights 36, that is connection status lights 92 and watering status lights 94, with a status light for each flow control device 12 in each row. Connection status lights 92 remain illuminated so long as the wiring for the associated zone is correct; if the wiring for any zone is not correct, the associated connection status lights 92 is not illuminated. Watering status lights 94 are illuminated whenever a valve check button 90 is pressed or controller 22 has provided a watering-on control signal to the associated flow control device 12 to place it in a watering state, and is therefore typically watering, and is not illuminated otherwise.

Watering can icon 76 is generally visible whenever the system is watering, that is during a watering cycle of the watering plan, during a check mode watering cycle, and during a single watering cycle. It is not visible when valve check button 90 is pressed.

A 24VAC status light 96 will come on when the adapter power is properly connected and the internal power breaker is set. If the AC 24V adapter, typically used with water timer 10, is not connected, status light 96 will not be lighted. All programming functions on the unit can be used on batteries without the AC 24V adapter connected. The 24VAC adapter must be connected, in a preferred embodiment, to operate the sprinkler valves.

During a watering cycle, only the watering duration area 40 for the active zone will count down; all others will show their set durations. Watering status light 94 will be illuminated to show that the watering is active for that zone. Only one watering status light 94 would be ON at any one time, plus any pump LED (not shown), which may be used when a pump is used with the system.

Figure 4:
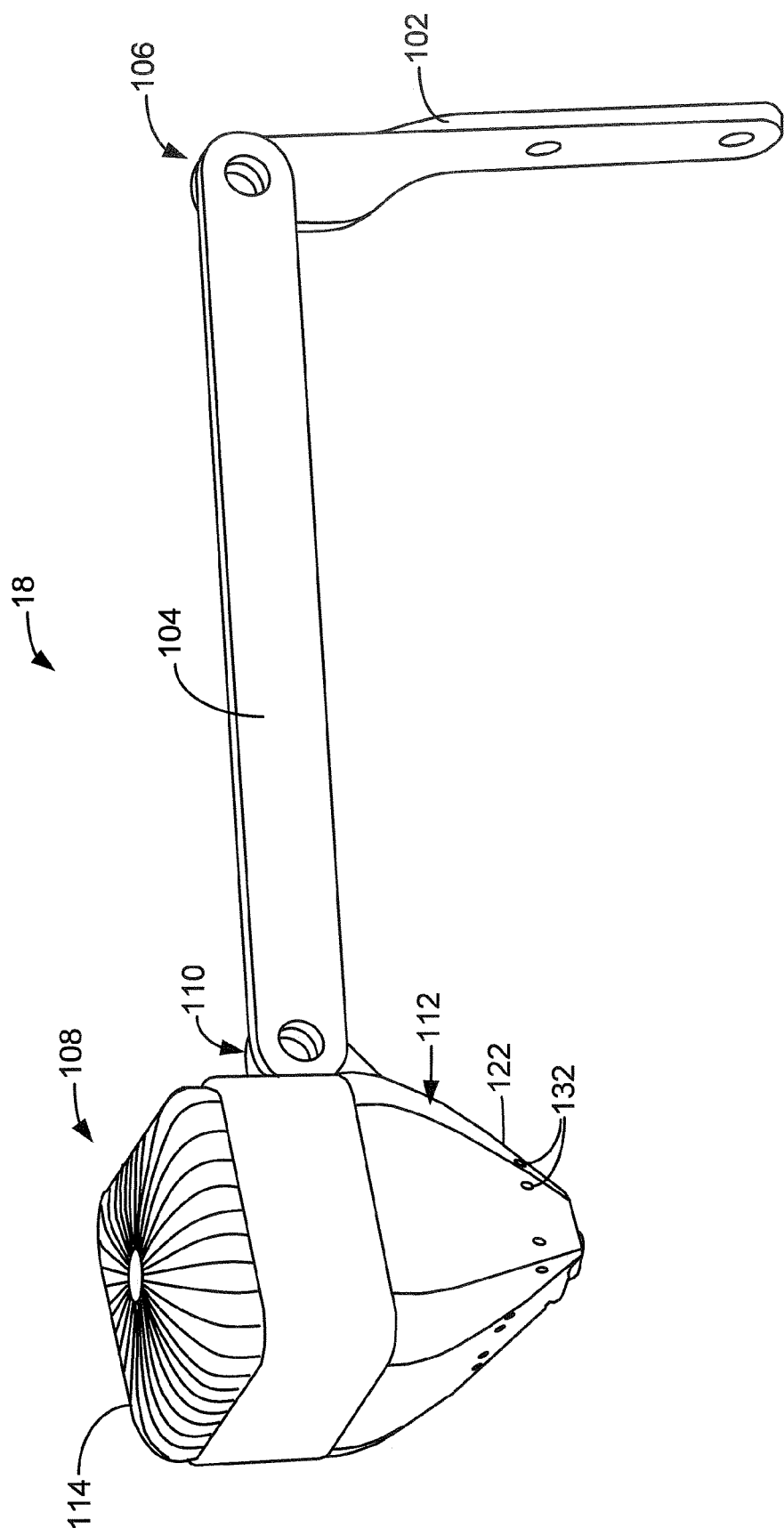
FIG. 4 is an overall view of the rain sensor of FIG. 1.
Figure 5:
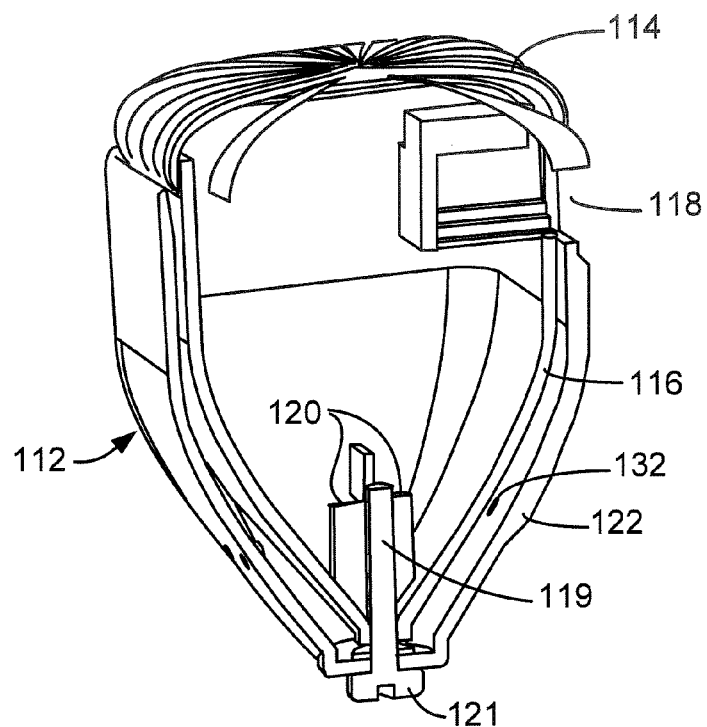
FIG. 5 is a cross-sectional view of the rain collection head of the rain sensor of FIG. 4.
Figure 6:
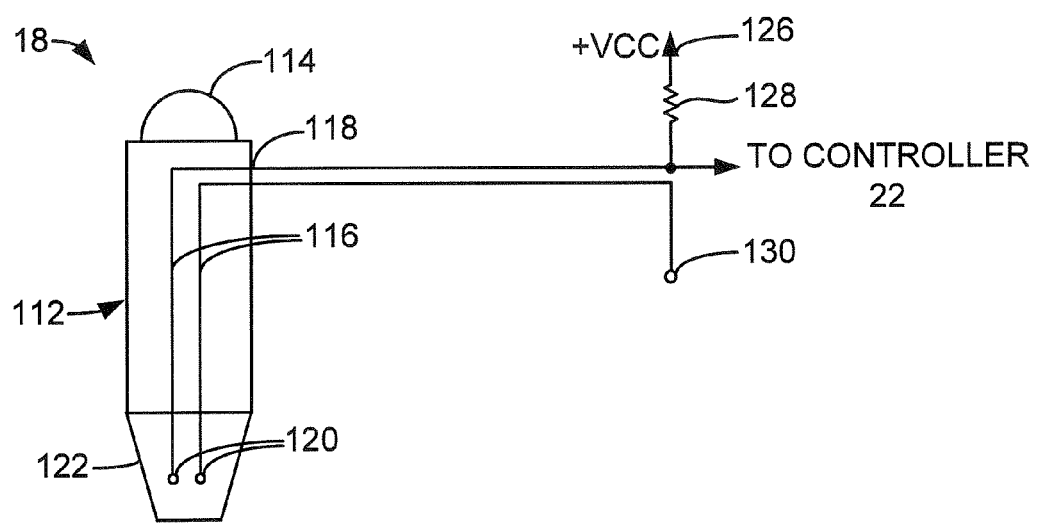
FIG. 6 is a schematic circuit diagram of the rain sensor of FIGS. 4 and 5.

FIGS. 4-6 illustrate a simplified version of rain sensor 18. Rain sensor 18 includes a mounting bracket 102 to which a support arm 104 is secured at a pivot joint 106. A rain collection head 108 is mounted to the distal end of support arm 108 at a second pivot joint 110. Head 108 includes a body 112 covered by a debris filter 114. Two electrically insulated wire leads 116 extend from an electrical connector 118 and terminate at electrically uninsulated detect points 120. Detect points 120 are positioned at the upper end 119 of an adjustment screw 121 extending upwardly from the bottom 122 of body 112. As indicated in FIG. 6, a cable 124 connects one of the wire leads 116 to a voltage source 126 through a high resistance resistor 128 and the other wire lead 116 to ground 130.

When the water level has reached detect points 120, controller 22 detects a change in current passing between detect points 120 and is therefore is provided an indication that it is raining Weep holes 132 are formed body 112 to permit water above the level of weep holes 132 to slowly drain from rain collection head 108. Therefore, after it has stopped raining, or if it is raining very slowly, water level above weep holes 132 will slowly drop to once again expose detect points 120 thus providing controller 22 with an indication that it has stopped raining.

Adjustment screw 121 permits the location of detect points 120 to be adjusted relative to weep holes 132. Adjusting screw 121 so that detect points 120 are above the level of weep holes 132 causes controller 22 sense rain once the water level within body 112 has reached detect points 120. After the water level has reached detect points 120, so long as the amount of rain entering body 112 exceeds the amount of rain passing through weep holes 132, controller 22 will continue to sense rain. The higher the level of detect points 120, the greater the amount of rain that must be collected before controller 22 senses that it is raining.

In some situations it may be desired to position detect points 120 below the level of weep holes 132. After a rain has caused detect points 120 to be immersed in water, the detect points and will remain immersed until the water level has dropped due to, for example, evaporation or manual extraction. If desired, weep holes 132 may be provided at different levels. Also, some or all of the weep holes may be variable restriction weep holes or the user may be provided the option of adding or removing weep holes.

If water timer 10 is in a run mode, so that run/suspend icon 68 is not blinking, and rain is detected, the timer will go to a suspend mode and the rain suspend icon 72 will come on. When there is no longer rain detected for, in one embodiment, 12 hours, water timer 10 will go back to a run mode, so that the rain suspend icon 72 is off, and continue the watering plans from that point. If rain is again detected during the 12 hours, the rain suspend cycle is restarted. If the blinking rain suspend icon 72 is pushed during the 12 hours following the point in time at which rain is no longer detected, water timer 10 will continue with the watering plans and rain detector 18 will again be enabled after about 1 minute. If rain suspend icon 72 is on, touching rain suspend icon 72 or rain suspend button 82 will stop the rain suspend function until rain is again detected.

Water timer 10 may be designed to go into a suspend state, during which all watering is terminated, at and below, for example, 40° F. (5° C.). Also, an internal heater may be used to protect touch screen 32 when the temperature goes below, for example, 20° F. (−7° C.).

Figure 7:
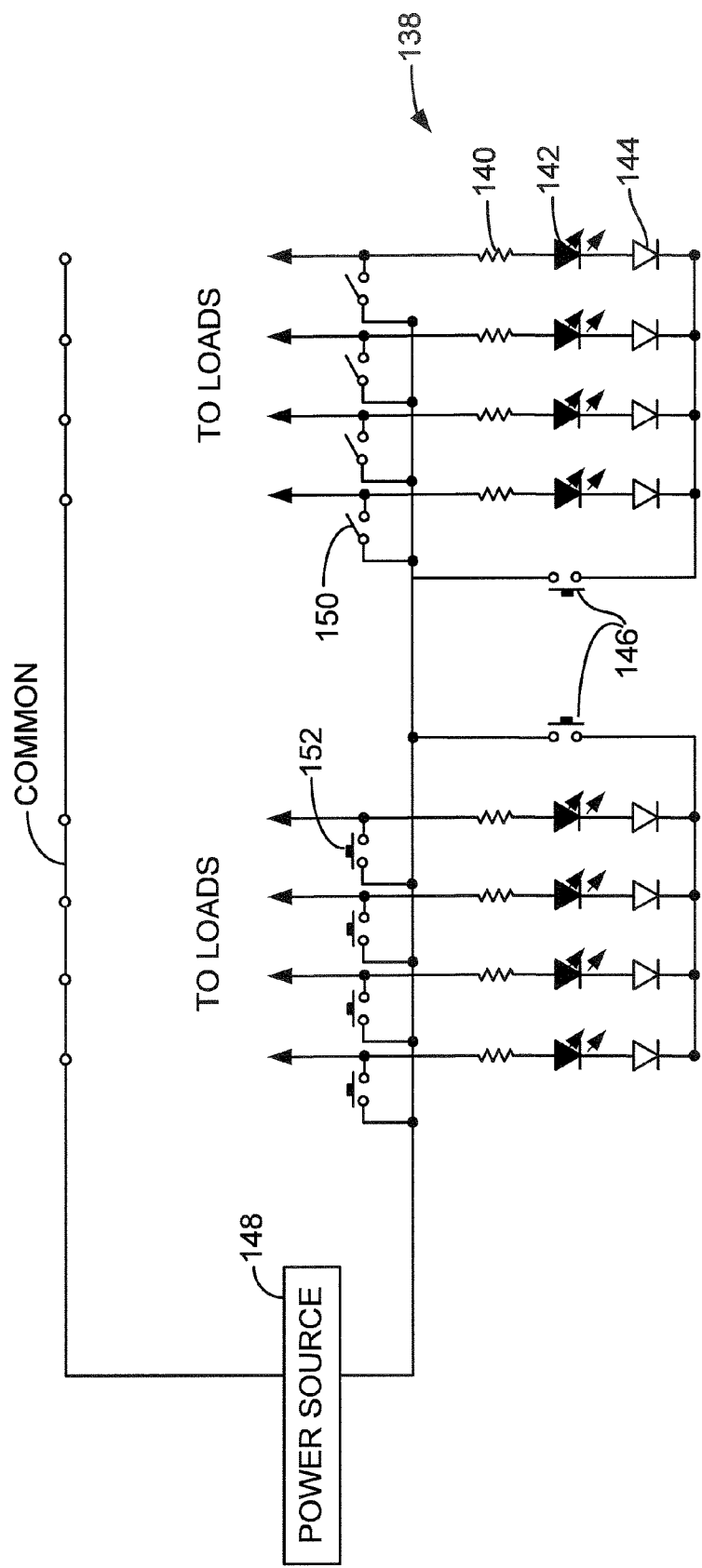
FIG. 7 is a simplified, generic version of self-testing circuitry suitable for use with the water timer of FIGS. 1-3.

FIG. 7 is a simplified, generic version of test circuitry that can be used with water timer 10. The basic concept is to disconnect the load(s) (such as flow control solenoids 12) from a controller, such as controller 22. This is typically accomplished by first opening or removing the back plate containing the test circuitry. Two simple tests, discussed below, are accomplished to determine if a perceived problem is a problem with the controller or with the load. The first step uses wiring test circuitry 138, including a current-limiting resistor 140, an LED 142 and a diode 144 for each load, and a wiring test button 146. Closing wiring test button 146 causes each LED 142 connected to its associated load to illuminate only if the load is properly connected to power source 148. If an LED 142 does not illuminate, there is a problem with the connection of power source 148 to its associated load. Therefore, this test shows that the load is getting power from power source 148. (The current-limiting resistor 146 sufficiently large to limit the amount of current supplied to the load to prevent actuation of the load during this first test.) Assuming the load is getting power from power source 148, the user proceeds to the second test. The second test is accomplished by actuating the function test switch/button 150, 152 of a second, test function circuit 154 to "turn on" the load by connecting the load to power source 148; if the load does not operate as expected (for example, the flow control device 12 does not operate to allow water to flow through the associated watering line 28), the problem is with the load, not controller 22, because the load is properly connected to power source 148. If the load does operate as expected, then the perceived problem is with controller 22. This test circuitry can be particularly useful for troubleshooting a perceived problem with controller 22 during a telephone service call. Actuating a test switch/button 150, 152 is similar to pressing a valve check button 90.

Operational Details

A basic goal of the invention is to strive to have the ability to set the watering plan any way the user wishes. This gives the user maximum flexibility. The system strives to be seamless, i.e. a user should be able to set the watering plan as user believes appropriate, not as a particular protocol demands. Having all the necessary information and controls on a single touch screen helps to achieve this goal.

One aspect of the invention is the recognition that there are four basic selection that must be made for a single watering plan: day, start time, zone and watering duration. In a preferred embodiment the user can select these in any order. In other embodiments there may be some restriction on the order of selection. For example, in one embodiment a start time must be selected before the zone and duration are selected, while the day can be selected at any time; also, in this embodiment either (1) the zone is first selected, by touching the appropriate zone input area 38, and then the duration for the selected zone is selected using either input areas 42, 44 or watering duration areas 40, or (2) the zone is automatically and simultaneously selected by touching the appropriate watering duration area 40 for that zone.

With the present invention the user can choose to use different types of watering plans. Two examples of watering plans are called the zone based watering plan and the start time based watering plan. Briefly, in a zone based watering plan the user selects the watering duration for each zone, the watering select start time(s), and what days are to be watered. With a start time based watering plan each start time can have different zone durations and different days. The objective is to be able to water a zone with different durations in, for example, the morning and evening, i.e. one duration per zone per start time, for maximum versatility. The following, based upon one embodiment of the invention, summarizes procedures followed with two types of watering plans. Other embodiments may result in somewhat different procedures.

Watering Plans—Basic Procedure

Press lock/unlock button 88 or lock/unlock icon 78 to unlock water timer 10 to permit the watering plan to be entered. Start time input area 48 for start time 1, also called the first start time, flashes. (If a different start time is desired, such as input area 48 for start time 3, the appropriate input area 48 is pressed and will flash.) The start time is set by pressing on arrows 42, 44, such as by using a stylus (not shown), to advance and roll back the time in display area 46 until the start time is displayed. Touch a zone number at zone input areas 38 to select a zone; the selected zone is boxed and flashes. The duration for the selected zone is then set by either touching the appropriate position along the water duration area 40 for the selected zone or by using increase arrow 42, and decrease arrow 44 if necessary. In either event, the watering duration will be illustrated graphically along area 40 in a manner similar to a bar graph and by a numeric indication at date/time display area 46. Select and set the desired day or days for the selected start time by pressing one, some or all of the day input areas 54 or by pressing one of the other selected day input areas 56. The appropriate area(s) 54, 56 will be boxed and blink.

In the disclosed embodiment if a start time for the selected start time input and display areas 48, 50 has not been previously entered, a start time must be entered for such selected start time input and display areas 48, 50 before the duration for any zone for that selected start time can be entered. Except for this minor limitation with some embodiments (which will typically occur only when water timer 10 is first used), a user can input original information for a watering plan or changes to a watering plan (zones, days, start times, durations) in any order. Also, each start time has the same day(s) selection from input areas 54, 56 for any and all zones. In the disclosed embodiment water timer 10 has been programmed so that only a single flow control device 12 will be operational at any one time. Therefore, when multiple zones are selected for the same start time, or if there is an overlap of start times, the zones will be watered one at a time in numerical order. Other embodiments may permit two or more flow control devices to be a simultaneously operational so that there may be watering overlap for this reason as well.

Zone Based Watering Plan

Following the Basic Procedure above, a user can store the watering plan for the selected zone by touching the next desired zone. The blinking zones 38, start times 50 and days 52 will all go off. A different zone can then be selected and a new watering plan can be entered for that zone. Note that the user can touch each zone input area 38 to open it, to initially set, review or change information relating to that zone. Touching zone input area 38 again stores that zone's watering plan. When finished, lock/unlock key 88 is pressed to lock water timer 10 and returned to the run mode.

Zone/Start Time Based Watering Plan

Following the Basic Procedure described above, a user can proceed by selecting and setting a new start time. The Basic Procedure is then repeated for the new start time. This procedure can be repeated for other start times up to, in the disclosed embodiment, 5 start times. To apply (store) each zone's watering plan, touch the next desired zone. Each start time can have different durations and days for each zone. Each zone can have different durations for each start time. When finished, lock/unlock key 88 is pressed to lock water timer 10 and returned to the run mode.

Water Logic (Ambient Environment System)

When the water logic icon/input area 61 is touched, in one preferred embodiment for 3 seconds, the present readings of humidity at humidity display area 60 and temperature at temperature display area 58 will be set as the 0% reference, i.e. the starting point. These starting points are also referred to as the base ambient temperature and the base ambient humidity. The following percentage increases and decreases in watering time are exemplary for one preferred embodiment.

If humidity goes up, the watering will be decreased by the same percentage. (+1%=−1%) If humidity goes down, the watering will increase by the same percentage. (−1%=+1%) The % increase or decrease in the watering time is called the delta. When temperature goes up, the watering will increase by, for example, 4% per degree F. Example, 70F to 95F=+25F, at 4% per degree F., the delta will go from 0% to +100%. (+1F=+4%) When temperature goes down, the watering will decrease −4% per degree −F. Example, 70F to 45F is −25F, at −4% per degree F., the delta will go from 0% to −100%. (−1F=−4%) Other % per degree F. may be used, preferably between 1% to 10% per degree F. In the disclosed embodiment the temperature and humidity deltas are fixed in controller 22; other embodiments may be constructed to permit the user to adjust the temperature and humidity deltas.

Using international units, when the temperature goes up, the watering will increase by, for example, 7.2% per degree C. Example, 21° C. to 35° C.=+14° C., at 7.2% per degree C., the delta will go from 0% to +100%. (+1C=+7.2%) When temperature goes down, the watering will decrease −7.2% per degree C. Example, 21° C. to 7.2° C. is −13.8° C., at −7.2% per degree C., the delta will go from 0% to −100%. (−1F=−7.2%) Other % per degree C. may be used, preferably between 1.8% to 18% per degree C.

Because the temperature and humidity vary considerably in different parts of the country, and across seasons, is preferred if the user can easily set and/or reset a starting point. Initially, when the user touches water logic icon 61, the starting point (0% change) is whatever the temperature and humidity are at that time of day, for example 2:00 p.m., sometimes referred to as the chosen time of day. The initially sensed ambient temperature and humidity are sometimes referred to as the base ambient temperature and the base ambient humidity. Until the user initially touches water logic input area 61, the water logic feature will not activate. The delta change for the next watering cycle will be dependent on the base temperature and the base humidity. The base temperature and base humidity, in this embodiment, stays the same but is compared against the current temperature and humidity each day at, in this example, 2:00 PM as long as the water logic feature is on. The base temperature and the base humidity are set and do not change so long as the water logic feature is active. In other embodiments the base temperature and the base humidity may change every day, or every other day, or every week, etc. In either event delta changes, in the preferred embodiment, will be effective for the next 24 hours. The temperature and humidity measured for purposes of computing the delta changes are measured each day at the chosen time of day, again in this example 2:00 PM. To shut off the water logic function, the user touches icon 61 again and it toggles off.

EXAMPLE

At 2 p.m. (the chosen time of day) the user touches water logic input area 61 and the water logic function becomes operational. The present temperature is reading 70F (the base ambient temperature) and present humidity reading is 40% (the base ambient humidity) so these values will define the starting point (0% delta).

Some days later the weather changed, three examples:

1. The temperature went from 70° F. to 90° F. (21° C. to 32° C.) and the humidity stayed at 40% at 2 p.m.; the watering would be increased by 80% (+4% change per degree +F.) (+7.2% change per degree +C.) so that the display area 62 would display a delta of +80%.

2. The temperature stayed at 70° F. (21° C.) and the humidity went from 40% to 80% at 2 p.m.; the watering would be decreased by 40% (−1% change per +1% humidity).

3. The temperature went from 70° F. to 90° F. (21° C. to 32° C.) and the humidity went from 40% to 80% at 2 p.m.; the watering would be increased by 40% (+80% temperature delta −40% humidity delta).

The delta (adjustment) factor is on screen display area 62 only when the water logic function is on. This permits the user to watch the delta factor at display area 62, learn how it works and determine if and when the user wants to use the water logic function. Using the water logic function the user can accurately determine and change the starting point when needed by watching the temperature, humidity, and delta factor all at the same time, anytime.

In the disclosed embodiment the base temperature and base humidity are the sensed ambient temperature and humidity. In some embodiments it may be desired to allow the user, or the manufacturer, to input a base temperature and base humidity against which the current base ambient temperature and base ambient humidity are compared.

The watering adjustments are typically discussed with regard to changing the length of time of watering. However, the amount of water discharged in a watering cycle can also be adjusted by changing the rate of water discharge, such as by changing the water pressure applied to watering lines 28, or by both changing the watering time and the rate of discharge.

Other modification and variation can be made to the above disclosed embodiments without departing from the subject of the invention as defined by the following claims. For example, the number of zones, the number of start times, and the 12- or 24-hour rain delay may be changed from those discussed above. The system may be designed to operate on battery power only. Valves 12, or other flow control devices, may be of types that operate on other than 24 VAC, such as DC and other AC voltages.

Any and all patents, patent applications, and printed publications referred to above are incorporated by reference.

The invention claimed is:

1. A method for automatically adjusting the amount of water supplied by a water timer, the water timer of the type comprising a user interface, a controller coupled to the user interface and programmed to provide control signals for controlling a plurality of flow control devices, each flow control device capable of controlling the passage of water from a water source to a watering zone, the method comprising:
    choosing a time of day on a base day;
    sensing, at said chosen time of day on said base day, a base ambient temperature and providing a base ambient temperature signal to the controller;
    sensing, at said chosen time of day on said base day, a base ambient humidity and providing a base ambient humidity signal to the controller, the humidity is expressed as a percentage from 0% to 100%;
    subsequently sensing a current ambient temperature and providing a current ambient temperature signal to the controller;
    subsequently sensing a current ambient humidity and providing a current ambient humidity signal to the controller;
    the subsequently sensing steps being carried out on at least one day following the base day at a time corresponding to said chosen time of day; and
    modifying control signals, thereby modifying watering amounts, according to the base and current ambient temperature signals and the base and current ambient humidity signals, the control signals modifying step:
        decreases the watering amount according to an amount equal to X times any amount the ambient humidity, expressed as a percentage, is greater than the base humidity;
        increases the watering amount according to an amount equal to Y times any amount the ambient humidity, expressed as a percentage, is less than the base humidity;
        decreases the watering amount according to an amount L, expressed as a percentage, times any amount the ambient temperature is less than the base temperature; and
        increases the watering amount according to an amount G, expressed as a percentage, times any amount the ambient temperature is greater than the base temperature.

2. The method according to claim 1, wherein the choosing step is carried out by a user actuating a base-setting input of said interface at the chosen time of day on the base day.

3. The method according to claim 1, further comprising selecting the time corresponding to the chosen time of day to be the same time of day.

4. The method according to claim 1, wherein the control signals modifying step is carried out with X and Y each ranging from about 1 to 4 and wherein the amounts L and G are each about 1% to 10% when the temperature is measured in Fahrenheit.

5. The method according to claim 1, wherein:
    the control signals modifying step is carried out with X and Y each being about 1; and
    the amounts L and G are each about 4%.

6. A method for automatically adjusting the amount of water supplied by a water timer, the water timer of the type comprising a user interface, a controller coupled to the user interface and programmed to provide control signals for controlling a plurality of flow control devices, each flow control device capable of controlling the passage of water from a water source to a watering zone, the method comprising:
    choosing a time of day for a base day;
    sensing, at said chosen time of day on said base day, a base ambient temperature and providing a base ambient temperature signal to the controller, the temperature being measured in Fahrenheit;

sensing, at said chosen time of day on said base day, a base ambient humidity and providing a base ambient humidity signal to the controller, the ambient humidity being expressed as a percentage from 0% to 100%;

subsequently sensing a current ambient temperature and providing a current ambient temperature signal to the controller;

subsequently sensing a current ambient humidity and providing a current ambient humidity signal to the controller the subsequently sensing steps being carried out on at least one day following the base day at said chosen time of day; and modifying control signals, thereby modifying watering amounts, according to the base and current ambient temperature signals and the base and current ambient humidity signals, the control signals modifying step:

decreases the watering amount according to an amount equal to 1 times any amount the ambient humidity, expressed as a percentage, is greater than the base humidity;

increases the watering amount according to an amount equal to 1 times any amount the ambient humidity, expressed as a percentage, is less than the base humidity;

decreases the watering amount by 4% times any amount the ambient temperature is less than the base temperature; and increases the watering amount by 4% times any amount the ambient temperature is greater than the base temperature.

* * * * *